United States Patent [19]
Hollingsworth et al.

[11] Patent Number: 5,444,836
[45] Date of Patent: Aug. 22, 1995

[54] APPARATUS AND METHOD FOR IMPROVED PLACEMENT OF OBJECTS IN COMPUTER AIDED DRAFTING

[75] Inventors: Robert E. Hollingsworth, Boulder; Eugene P. Kindrachuk; James E. Hargis, both of Englewood, all of Colo.

[73] Assignee: Information and Graphics Systems, Inc., Boulder, Colo.

[21] Appl. No.: 208,976

[22] Filed: Mar. 10, 1994

[51] Int. Cl.⁶ ............................................. G06T 17/00
[52] U.S. Cl. .................................... 395/135; 395/133; 395/141; 395/155; 395/161; 395/919
[58] Field of Search ............................... 395/133-139, 395/141, 155, 161, 906, 907, 919-921; 364/505, 512

[56] References Cited

U.S. PATENT DOCUMENTS

| | | | |
|---|---|---|---|
| 4,964,060 | 10/1990 | Hartsog | 364/512 |
| 5,227,983 | 7/1993 | Cox et al. | 364/512 |
| 5,293,479 | 3/1994 | Quintero et al. | 395/161 |
| 5,329,464 | 7/1994 | Sumic et al. | 364/512 |

OTHER PUBLICATIONS

Giselle, "Product Description," 1993.
Giselle, "An Introduction," 1994.
Giselle, "Technical Overview," 1994.
Giselle, "Giselle: Automatic Generation of Network Schematics," Oct. 1994.
IBM, "NESYS User Guide," 1991.
AMIS AS, "NETIS/T General Information," Nov. 23, 1990.

*Primary Examiner*—Almis R. Jankus
*Attorney, Agent, or Firm*—Duft, Graziano & Forest

[57] ABSTRACT

Apparatus and methods for creating and applying flexible, user defined rules for placement of graphical objects in a computer aided drafting (CAD) application. The rules for precise placement and overplotting of graphical objects may be defined by a user with significant flexibility. The user defined rules are applied by the placement subsystem of the present invention to automate the proper placement of graphical objects according to the specific rules of the particular user. CAD systems are enhanced by their integration with the automated placement subsystem of the present invention.

11 Claims, 4 Drawing Sheets

APPARATUS AND METHOD FOR IMPROVED PLACEMENT OF OBJECTS IN COMPUTER AIDED DRAFTING

BACKGROUND OF THE INVENTION

1. Field of the invention

This invention relates to the field of computer aided drafting (hereafter referred to as CAD) systems. In particular, the present invention relates to a placement subsystem comprising methods and structures for enhancing the flexibility of such CAD systems for automated placement of objects on images generated by CAD systems.

2. Background Art

Computer aided drafting (CAD) systems improve the productivity of repetitive manual procedures common to use drafting systems. Users of such systems use alphanumeric input means, such as a keyboard, and graphical input means, such as a mouse or tablet, to direct a computer system to create or modify graphical images. The graphical images are comprised of one or more graphical objects positioned within the graphical image. Graphical objects may be lines, symbols, geometric shapes, text, or other constructs which are to be placed on the graphical image. The current graphical representation of the user defined graphical image is usually displayed on a display means such as a CRT display. A user of such a system manipulates the graphical image until satisfied with the appearance and then may direct the CAD system to save the graphical image for later use or produce "hard copy" output on a permanent medium such as a paper copy of the image created by a plotter device.

In the use of most CAD systems, the user identifies the placement position, placement angle, size, and other graphical attributes of each graphical object. In some applications of such CAD systems the placement of graphical objects with respect to one another is not critical. In such situations, simple freehand drawing by the user may be sufficient to place one graphical object visually near another graphical object. When more precision is required in the relative placements of graphical objects, a common approach in CAD systems is to force a graphical object to "snap to" a nearby grid location. Snapping serves to automatically reposition a graphical object to align a point on the object with a nearby standard grid location. This method helps assure that all graphical objects have a similar relationship to standard dimensional grid positions on the graphical image.

In still other applications of CAD systems, the relative placement and interconnection of graphical objects may depend on the semantic interpretation to be applied to the graphical object. In other words, the relative placement of graphical objects may imply relations exist between the graphical objects. Automated analysis can determine whether the relations are valid or invalid. Such 10 semantic dependencies determine the appropriate placement of a graphical object by determining the semantic meaning for that object as well as for other objects positioned nearby on the graphical image. For example, in CAD systems used in electrical engineering applications, the CAD system may attempt to prevent a user from connecting a wire symbol between a symbol representing a DC voltage and a symbol representing electrical ground. Such a connection between these graphical objects would be interpreted as a direct short between power and ground and therefore a CAD system may preclude such placement of these graphical objects. Some vendors of CAD systems used in electrical engineering configure their systems with libraries or databases containing several rules for controlling the relative placement of graphical objects based on the electrical semantic meaning associated with each graphical object. For example, such database entries may define electrical attributes for graphical objects including electrical current sinking and sourcing requirements, electrical capacitance, and signal type (input, output, power, ground, etc.), to permit validation of the electrical connections between the several graphical objects.

In yet other applications of CAD systems, the rules for relative placement of graphical objects are more complex. For example, in the utilities industries, maps indicating location and interconnection of devices are drawn according to rules developed over decades of manual drafting procedures. These rules define the procedures to be followed by a draftsperson in modifying a map to reflect changes made in the placement or interconnection of utility devices by field repair personnel. By way of example, there are rules which determine which types of graphical objects may be drawn over other types of graphical objects (hereafter referred to as "overplotting"). Other rules dictate an offset location and angle at which textual labels may be placed relative to the graphical object being labelled. Still other rules control the starting position and incremental angles for connecting a plurality of graphical objects referred to as "devices" to an associated graphical object.

A problem arises for current CAD applications processing such complex sets of rules for graphical object placement and interconnection such as those described above with respect to the utility industries. The number and complexity of rules controlling the placement and interconnection of graphical objects on the graphical image for drafting maps in the utility industries can dramatically increase the complexity of CAD system products by adding specific methods to implement each rule. To avoid adding such complexity to a general purpose CAD system, prior systems have placed a significant burden on the user of the CAD system to manually apply the various rules when creating the graphics image.

Another aspect of the above problem is that the set of complex rules described above for drafting maps in the utility industries is highly variable between utility companies. CAD systems attempting to automate these rules and processes must confront additional complexity in implementing such rules in a manner unique to each customer in the utility industries.

SUMMARY OF THE INVENTION

The present invention solves the problems discussed above and others by providing an automated placement subsystem comprising structures and methods used in conjunction with CAD systems for producing graphical images. The placement subsystem permits a user to easily create and customize the rules governing the placement and interconnection of graphical objects on the graphical image being generated using the CAD system. Attributes and information associated with the graphical objects to be placed are retrieved by the placement subsystem from an database subsystem. The placement subsystem applies the user defined rules to the information and attributes retrieved from the database subsystem to determine the proper placement of the graphical objects on the graphical image without human intervention.

The present invention comprises structures for defining a broad range of rules governing placement and orientation of a class of graphical objects on a graphical image. Additional rules may be defined within the structures of the present invention to control overplotting of one graphical object by another graphical object. The structures of the present invention include elements which define the rules for placement and overplotting of classes of graphical objects in such a manner as to permit each user to customize the CAD system to implement unique drafting standards. In addition to these rules, the structures contain a user supplied database query entry used to locate objects stored in the database system. The query contained in the structure for a class of graphical objects defines the class of objects by locating only objects in the database subsystem which match the conditions specified by the query. The rules in the structure are applied to all graphical objects located in the database subsystem which match the requirements of the user supplied query. The query is applied to the database subsystem to extract information regarding each graphical object to be placed such as the type of the object and parameters for its nominal placement on the resulting graphical image.

The present invention further comprises methods for automatically manipulating and interpreting the structures containing the user defined rules to correctly place the desired graphical objects on the graphical image without human operator intervention. The rules defined by the user in the form of the structures discussed above represent a template for the creation of graphical objects to be output on the graphical image. The method processes each of the rules defined by the user as represented by the structure discussed above. First, the database query is performed on the database subsystem to retrieve information on all graphical objects to be placed according to the structure being processed. Next, for each graphical object for which information is retrieved from the database subsystem, the methods of the present invention apply the placement rules defined in the above described structures to determine placement, orientation, labelling, and overplotting of each graphical object. Some rules defined in the structures discussed above possess iterative properties so that their application by the methods of the present invention comprise repetitive operations to determine the best placement of the graphical object. The completed application of all rules defined in the structure determines the actual placement of the class of graphical objects defined by the database query element of that structure. After completion of placing one class of graphical objects, the next structure representing a class of graphical objects is processed in like manner until all graphical objects defined by the user are processed.

The structures and methods of the present invention permit a user of the placement subsystem to easily customize the drafting rules to be applied by the CAD system in generating the desired graphical image. This serves to reduce the burden on the user of manually applying complex drafting rules in creating or modifying graphical images. Additionally, the placement subsystem of the present invention relieves the burden on the user while maintaining a generalized architecture that may easily be adapted to the drafting standards of another user.

The placement subsystem of the present invention provides a flexible interface to the database subsystem which supplies information and attributes regarding graphical objects to be placed on the graphical image. The placement subsystem can be easily adapted to the particular environment of the user's database subsystem. The SQL query language is used in the placement subsystem's access to the database subsystem. Use of the SQL query language permits easy adaptation to a wide spectrum of commercially available database systems. The database system and placement subsystem may coexist on a single computer system or may be distributed in a network of computing systems. Similarly, the placement subsystem is designed such that it may directly produce the graphical output for the resulting map, or may produce instructions to be communicated to a CAD system which creates the desired graphical output. The CAD system and placement subsystem may coexist on a single computer system or may be distributed in a network of computing systems. In the best known embodiment of the present invention, the database system and placement subsystem are distributed over a client/server computing network while the placement subsystem and the CAD system (drawing subsystem) are tightly coupled on a single computing environment.

DETAILED DESCRIPTION OF THE PREFERRED EMBODIMENT

Figure 1:
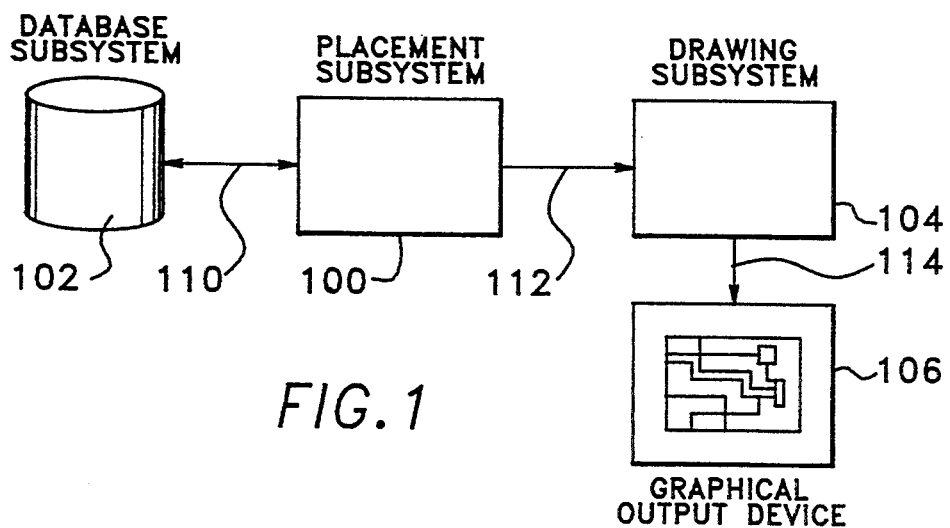
FIG. 1 shows the relationship of the placements subsystem of the present invention with the database subsystem and drawing subsystem

FIG. 1 shows placement subsystem 100 of the present invention and its relationship to other subsystems. Placement subsystem 100 communicates with database subsystem 102 over bidirectional communication link 110 to retrieve information and attributes associated with graphical objects to be placed on a graphical image. Database subsystem 102 may represent any database means capable of storing and retrieveing information. Placement subsystem 100 manipulates the information retrieved from database subsystem 102 by applying user defined rules to determine the proper placement of the graphical objects on the graphical image. Placement subsystem 100 then communicates with drawing subsystem 104 over communication link 112 to instruct drawing subsystem 104 where to draw each graphical object on the graphical image. Drawing subsystem 104 transfers information to graphical output device 106 over communication link 114 to create the desired graphical image. The resulting graphical image constructed by graphical output device 106 shows the graphical objects placed on the graphical image according to the user defined rules manipulated by placement subsystem 100. Graphical output device 106 may represent any graphical output means capable of producing a graphical image for viewing by the operator.

It is clear to one skilled in the art that placement subsystem 100, database subsystem 102, and drawing subsystem 104 may coexist on a common computer system or may be distributed over a network of computer systems. If the subsystems reside on a common computer system, communication links 110 and 112 may be implemented as direct function calls or by other forms of interprocess communication known in the art. If the subsystems are distributed over a network of computer systems, communication links 110 and 112 may be implemented as remote procedure calls (RPC) or by other forms of interprocess communication known in the art. In the exemplary preferred embodiment described herein, placement subsystem 100 and drawing subsystem 104 are integrated by direct function calls on a common computer system, while placement subsystem 100 and database subsystem 102 are distributed over a computer system network and apply client/server computing methods well known in the art for interprocess communication.

Figure 2:
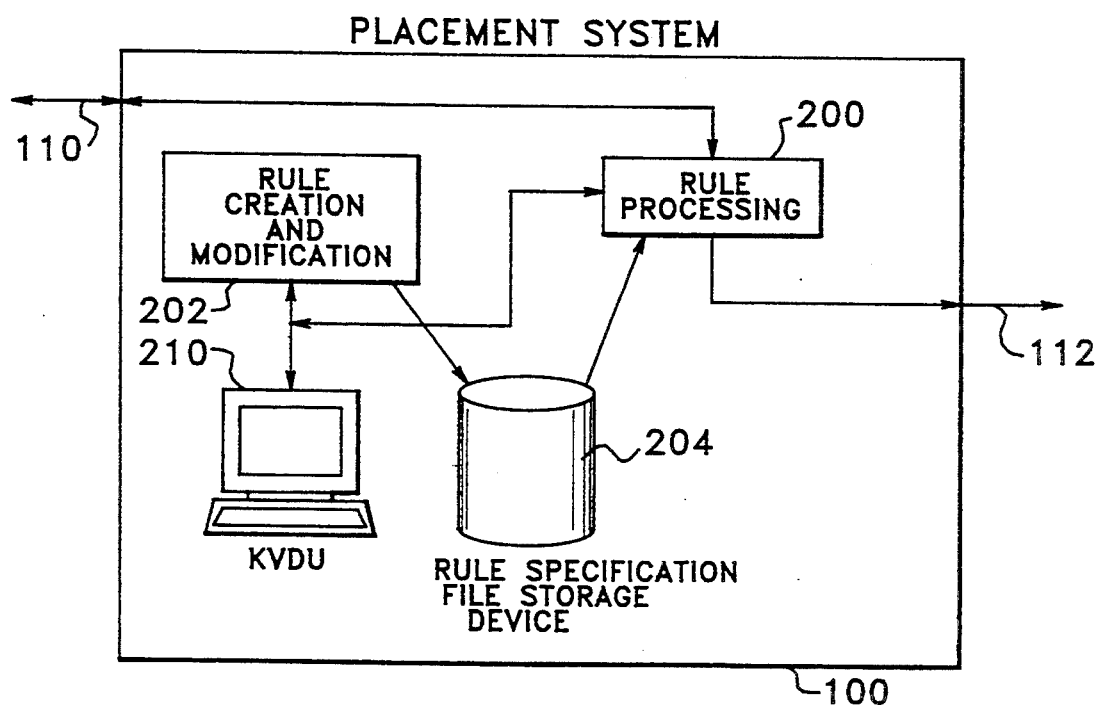
FIG. 2 shows additional details of the major components which comprise the placement subsystem of the present invention.

FIG. 2 depicts additional detail of the components within placement subsystem 100. A user of placement subsystem 100 uses rule creation and modification component 202 to create a textual file specifying the user defined placement rules to be applied in placement of all graphical objects. The rule specification file contains a structured record for each set of rules to be applied to a particular class of graphical objects being placed. The elements of the structured records in the rule specification file are keyword statements discussed in further detail below. The user defined rule specification file is stored for later access on storage device 204. The user creates and edits the rule specification file using the interface provided by keyboard video display unit 210 (KVDU). As will be discussed later, the syntactic representation of the user defined placement rules is a simple textual data file. It will be recognized by one skilled in the art that any standard method and apparatus for creation and editing of a textual data file may be used to create and maintain the user defined rule specification file. Rule creation and modification component 202 with associated KVDU 210 is intended only as an example of one preferred embodiment of a rule definition means and user input and output means. Storage device 204 is intended as an exemplary embodiment of the storage means for storing the user defined rules.

Rule processing component 200 represents the rule application means for automatically reading and applying the placement rules defined by the user of the rule definition means described above. Rule processing component 200 reads the rule specification file from storage device 204 when so requested by a user from KVDU 210 to initiate the creation of a graphical image on graphical output device 106. Each structured record read from storage device 204 includes a database query element to be applied by rule processing component 200 to database subsystem 102 (of FIG. 1) over communication link 110. The application of the query element to database subsystem 102 results in retrieval of zero or more information records. Each information record retrieved by the application of the query element to database subsystem 102 contains information regarding nominal placement of a graphical object to be placed on the graphical image. For some graphical objects called "placeable structures" (described in detail below), this information includes the nominal position and angle of the graphical object in absolute coordinates. Other objects are usually placed relative to one of these fixed location structures and so the nominal positioning information comprises identification information of the graphical object to which this graphical object is referenced. In alternative embodiments, nominal positioning information may comprise offset coordinates relative to the placement of a related graphical object. The query element retrieves records for all graphical objects in database subsystem 102 which match a specific set of selection criteria. Each structured record read from the rule specification file also includes the placement rules to be applied to the placement of each of the graphical objects defined by the information records retrieved from database subsystem 102. The placement rules are used to modify the nominal placement of a graphical object to prevent undesired overplotting of graphical objects on the graphical image.

After rule processing component 200 applies the user defined rules to place the graphical objects, it sends plotting instructions to drawing subsystem 104 (:of FIG. 1) to plot the graphics image on graphical output device 106. In this embodiment, rule processing component 200 of placement subsystem 100 issues direct function calls to drawing functions resident on the same computing system which hosts placement subsystem 100. Alternative embodiments permit rule processing component 200 to create a graphical image on KVDU 210 in parallel with creating a graphical image on graphical output device 106 (of FIG. 1) through drawing subsystem 104.

Rule Specification File, General Structure

The rule specification file is a textual file created by rule creation and modification component 202 as discussed above. Entries in the file specify a query element and associated placement rules. The placement rules are applied to graphical objects defined by information records found in database subsystem 102 by application of the associated query element. The structures and methods of the present invention may be applied to many computer aided drawing applications such as electronics, architecture, and mapping. To more easily explain the structure of the rule specification file this document focuses on the application of the present invention to the area of map drawing as commonly used in the utility industries. It will be recognized by one skilled in the art that variations in the syntax and semantics of the rule definitions permit the present invention to be easily applied to other areas.

In the utility industries it is common practice to maintain paper maps indicating the locations of utility system equipment along with interconnecting linear transmission devices. In addition, a database is usually maintained which records location information along with other information relating to the equipment and cables. The maps indicate the location of the equipment and cables along with textual information to annotate the generated map to reflect any changes. When field representatives of the utility install or repair equipment or cables, the database is updated. In addition, the updated location information and annotations are supplied to draftspersons to permit modification the paper maps. Historically, these draftspersons manually applied rules for placement, interconnection, and annotation of the various utility system equipment and cables. These rules may be encoded by the draftsperson into the rule specification file of placement subsystem 100 of the present invention.

The rule specification file of the present invention is a textual file which may be easily created and modified by the user of placement subsystem 100 of the present invention. The rule specification file comprises one or more keyword statements. A keyword statement comprises a keyword as defined below, followed by a left brace ("{"), followed by the keyword statement value, followed by a right brace ("}"). Depending on the type of keyword statement used, the keyword statement value could be either an atomic value or one or more additional keyword statements. In the rule specification file, spaces and new lines are ignored and may be used to aid the readability of the specification file. By way of example, the following outline depicts the general structure of a keyword statement:

```
KEYWORD {
    KEYWORD1 {
        KEYWORD2 {
            KEYWORD3 {VALUE1}
            KEYWORD4 {VALUE2}
            KEYWORD5 {VALUE3}
        }
        KEYWORD2 {
            KEYWORD4 {VALUE4}
            KEYWORD5 {VALUE5}
        }
    }
    KEYWORD1 {
        KEYWORD2 {
            KEYWORD3 {VALUE6}
        }
        KEYWORD2 {
            KEYWORD4 {VALUE7}
            KEYWORD5 {VALUE8}
        }
    }
}
```

In the above example, KEYWORD3, KEYWORD4, and KEYWORD5 all have atomic values associated with them, namely VALUE1 through VALUE8. KEYWORD has two keyword statements as its value, namely two different instances of KEYWORD1. KEYWORD1 and KEYWORD2 similarly comprise of other keyword statements. A keyword statement whose value contains additional keyword statements is herein referred to as a "high level" keyword statement. "Low level" keyword statements have atomic values for their corresponding value definitions. In the above example, KEYWORD, KEYWORD1, and KEYWORD2 are high level keyword statements and KEYWORD3, KEYWORD4, and KEYWORD5 are low level keyword statements. Each high level keyword statement in the rule specification file is designed to be used with particular additional high and low level keyword statements in its value definition. KEYWORD1 through KEYWORD5 are also referred to herein as "second level" or "nested" keyword statements because they appear within the value definition of another keyword statement. KEYWORD is a "first level" keyword statement because it is not nested within the value definition of another keyword statement.

The atomic values associated with low level keyword statements are of one of four types:

| | |
|---|---|
| INTEGER | Integer atomic values are whole numbers specified in decimal, octal, or hexadecimal formats. |
| FLOAT | Floating point atomic values are real numbers specified in decimal notation with a decimal point and optionally with exponential notation. |
| STRING | String atomic values are the sequence of characters appearing between the start and end brace of the keyword statement. |
| BOOL | Boolean atomic values are either true or false. |

Keyword statements possess certain properties that may apply in the interpretation of the rule specification file.

| | |
|---|---|
| REPEATABLE | Some keyword statements may be repeated within the value of another keyword statement. When a keyword statement is expected to repeat, the repeated values are used in the order specified by the user for a particular purpose for that keyword statement. Where the keyword statement is not expected to repeat, the repeating values are ignored and only the last value specified by the user in the rule specification file is applied to the keyword. Only high level keyword statements are expected to repeat. |
| DEFAULTS | Many keyword statements assume a reasonable default value in the application of the rules if the keyword statement is not defined to have a specific value in the rule specification file. Such defaults are listed below where applicable for each supported keyword. |
| OPTIONAL | Optional keyword statements may be omitted by the user without adversely impacting the graphical image being produced. Typically optional keyword statements have no default value per se, but rather may be left out entirely if desired by the user. |
| GROUPED | Grouped keyword statements represent a mutually exclusive set of keyword statements in which only one of the grouped keyword statements may be selected in applying the rule. If multiple grouped keyword statements are used in a value definition, only the last of the grouped keyword statements has any effect. |

Placeable Objects, Common Features

Before describing the syntax and meaning of each keyword statement it is useful to understand the broad architecture of the structures used to describe the rules for placement of graphical objects. The keyword statements are constructed by the user to define the rules for placing graphical objects on the graphical image. At the highest level, there are four types of objects collectively called "placeable objects" defined by first level keyword statements. These four objects correspond to the typical grouping of graphical objects into classes defined by most utility industries. The four types of objects are defined by the first level keywords: PS, PC, PD, and PB corresponding to placeable structures, cables, devices, and connection boxes respectively.

It will be seen by those skilled in the art that the grouping of graphical objects into these four categories can be applied to many application areas in addition to the utility industries. Placeable structures (PS) is more broadly defined to be anchoring graphical objects positioned to absolute coordinates on the graphical image. Other placeable objects are positioned relative to one or more anchoring placeable structures (reference objects). Placeable cables (PC) are more broadly defined to be linear transmission devices such as wires, cables, or pipelines which transmit material or information between two endpoints and which are graphically represented with line segments. Placeable connection boxes (PB) are more broadly defined to be equipment to which placeable cables attach. Placeable devices (PD) are more broadly defined to be equipment which attaches to placeable cables. Such broad application is within the intended scope of the present invention. While the remainder of this document discloses application of the present invention as applied to utility industries, one skilled in the art will readily recognize the applicability to other application areas.

By way of example, the following Table I suggests a mapping of equipment from five different utility industries to the four types of objects discussed herein.

TABLE 1

| Industry | Placeable Structures | Placeable Cables | Placeable Devices | Placeable Connection Boxes |
| --- | --- | --- | --- | --- |
| Telephone | Manholes, Poles | Conduit, Copper Cable | Repeaters, Terminals | Cross Connects |
| Electric | Pads, Poles | Conductor | Fuse, Switches | Transformers |
| Water Distribution | Simple Locations w/o Graphic Representation | Pipe | Valves | Pressure Regulator, Pumps |
| Gas Distribution | Manholes | Pipe | Valves | Regulator Station |
| CATV | Pedestal | Fiber Optic Cable, Coaxial Cable | Inline Equalizer, Power Stop | Amplifier, Coupler, Tap |

The first level keyword statements for these four types of placeable objects share many common features in their respective value definitions. The keyword statements which are common to most of the value definitions of the respective placeable object keyword statements are:

| | |
| --- | --- |
| SQL | This low level keyword statement of type STRING is defined to be the SQL language query to be applied to database subsystem 102 to locate all graphical objects matching the desired characteristics. The set of information records retrieved from database subsystem 102 in response to this query string defines the class of placeable objects |
| DS or TS or LS | One of this group of high level keyword statements is used to identify the drawing primitive to be used to draw the placeable object. The DS keyword statement is used to draw a symbol, the TS keyword statement is used to draw a text string, and the LS keyword statement is used to draw a line segment. Drawing primitive keyword statements are discussed in further detail below. |
| OA | This high level keyword statement defines the overplot detection algorithm to be applied for placement of this class of placeable objects. Currently, only one overplot algorithm is defined for use but one skilled in the art can easily see that varying overplot detection algorithms depending on the object to be placed can be a useful feature of placement subsystem 100 of the present invention. Overplotting detection techniques for placement subsystem 100 of the present invention are discussed below. |
| PG | This high level keyword statement defines the set of one or more placement rules to be applied when attempting to place this class of objects. See the discussion of placement rules below. |
| TB | This high level keyword statement defines the information required to place a block of text for annotation purposes in association with the placement of the graphical objects of this class. The text block keyword statement comprises most of the same elements of placeable objects discussed above, but is not placed on the graphical image independently. Rather, the text block keyword statement is defined only within the keyword statement value definition of a placeable object as just described. See the discussion of text block below. |

Overplotting

The placement rules to be described below are applied to determine the final placement of each placeable object on the graphical image. A particular placement rule succeeds or fails in its placement of a placeable object by determining if the placement resulting from application of the rule causes the placeable object to overplot another object. Overplotting of one object by another may be allowed or disallowed by use of the OID and OMASK low level integer keyword statements in the rule specification file constructed by the user. Each placeable object keyword statement may contain an OID keyword statement of type INTEGER assigning the placeable object an overplot ID value in the range 0 through 31. If no OID keyword statement is supplied for a placeable object, its default OID value is 0. In addition, each placeable object may contain an OMASK low level keyword statement of type INTEGER assigning the placeable object a bit mask indicating which other OID values (0 through 31) this object is permitted to overplot. For example, if a previously placed object has an OID equal to 5 and bit number 5 in the OMASK keyword value of the object to be placed is 0, then the object to be placed may overplot the previously placed object. Otherwise the object to be placed is not allowed to overplot the previously placed object.

To determine whether two objects overplot one another, values for each placeable object are determined which represent the minimum sized rectangle that would enclose the plotted symbol, text, or line in the rotated orientation in which it is already placed and drawn, or is yet to be placed. This computed values are the dimensions of the minimum bounding rotated rectangle (herein referred to as MBRR). To determine whether or not an object to be placed might overplot a previously placed object the MBRR for both objects are compared. If the MBRRs of the two objects overlap it can assumed that the objects themselves also overlap.

It will be recognized by those skilled in the art that many other approaches may be taken to determine the overlap of two graphical objects in two dimensions. The present invention chooses to implement one of the many approaches. Other approaches could be integrated within the architecture, spirit and scope of the present invention which permits each placeable object to select the desired overplot detection algorithm.

Placement Rules

Placeable objects are placed at a point on the graphical image. Regardless of the graphic symbol used to represent the graphical object, the objects are placed so that a base point associated with the object is on the placement point of the graphical image. The purpose of the placement rules is to adjust the placement point for a placeable object so that the symbol will be positioned properly with respect to surrounding symbols on the graphical image. The rules are defined by the user of placement subsystem 100 to meet the specific needs of the user and the application.

Each placeable object's first level keyword statement includes one or more placement rule keyword statements to determine the user's preferred placement of the corresponding class of graphical objects retrieved from database subsystem 102. The rules are applied during the placement of the placeable object in the order in which they are listed in the placeable object's keyword statement. Each rule is applied in order to determine a location on the graphical image for positioning the placeable object. If the placement resulting from application of the rule would result in placing the object outside the bounds of the graphical image, then the rule fails "outright" and the next rule is tried. In addition, if application of the rule fails due to improper information retrieved from database subsystem 102 then the rule fails "outright". This may be due to incorrect information recorded in database subsystem 102 relating to a reference object. If the application of the rule would result in the disallowed overplotting of another placeable object, as described above, then the rule fails but not outright, and the next rule is tried. If the application of the rule succeeds by avoiding overplot of another object or overplots only objects which are allowable according to the OMASK keyword statement, then that rule is used and the object is placed according to the dictates of that rule. If all rules are tried and either fail or fail outright, then the last rule attempted which did not fail outright will be used as a default. If all rules attempted fail outright, then the object is not placed on the graphical image. In other words the first rule in the list which does not fail is used, otherwise the last rule attempted which did not fail outright is used, otherwise the object cannot be placed on the graphical image.

There are four sets of high level keyword statements for placement rules which may be entered in a placeable object's keyword statement, namely: Placement Group (PG), Remote Area (RA), Included Angle (IA), and Repeat Segment (RG). Turning now to each set of rules.

Placement Group

The PG high level keyword statement may include any of four different high level keyword statements, namely: Location Agent, Scale Agent (SA), Angle Agent (AA), and Modification Agent. Location Group is a name for the GROUPED keyword statements: Offset Point (FP) and Line Offset (LO). Only one of the mutually exclusive Location Agents may be specified in the PG keyword statement. Similarly, Modification Agent is a name for the GROUPED keyword statements: Right Read (RR) and Agree Angle (GA). Only one of the mutually exclusive Location Agents may be specified in the PG keyword statement. Each of these rules applies a different transformation of the nominal size and position of the placeable object in an attempt to locate it on the graphical image.

Figure 3:
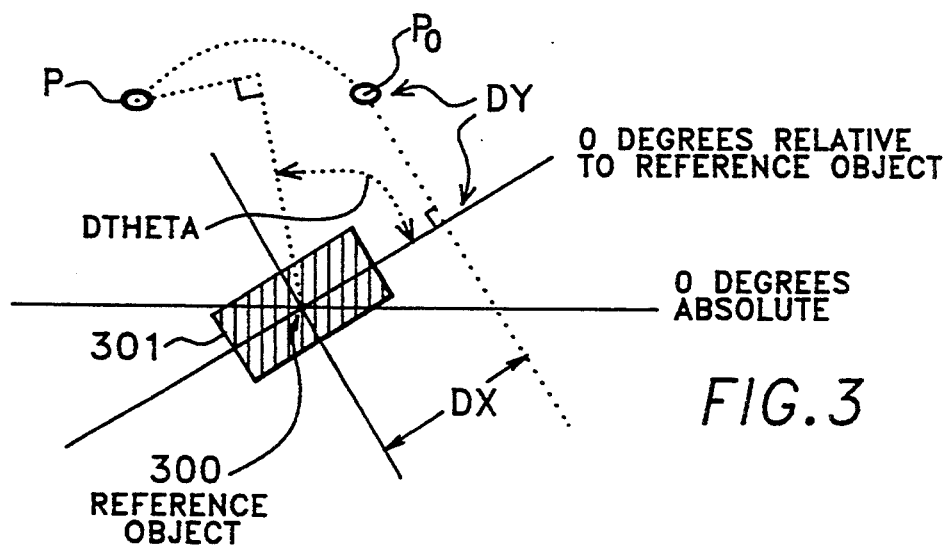
FIG. 3 is a sample graphical image resulting from the application of an Offset Point placement rule.

FP is a high level keyword statement that determines a placement point for positioning a placeable object relative to the position of a previously placed placeable object called the reference object. The offsets to be applied are defined by a combination of three low level keyword statements defined in the value of the FP high level keyword statement, namely: DX, DY, and DTHETA. DX, DY, and DTHETA are all low level keyword statements of type FLOAT. DX and DY are floating point values that supply an X axis and a Y axis offset respectively from the position of the reference object. The X and Y axes in this context are the axes of the reference object in its previously placed orientation. In other words, if the reference object was placed rotated some amount from the nominal X and Y axes of graphical output device 106, then the X and Y axes of the reference object are similarly rotated such that 0 degrees on the reference object axes is rotated from the nominal axes of the graphical output device 106. DX and DY define an offset to an interim placeable point from the base point of the reference object. Next, DTHETA is applied to the interim placement point to rotate the placeable point to the new placeable point position. DTHETA is a floating point value indicating the number of degrees to rotate the interim placement point. DTHETA is measured from zero degrees relative to the axes of the reference object. Through combinations of DX, DY, and DTHETA, a placeable object can be positioned anywhere relative to a previously placed object (the reference object). FIG. 3 is a sample graphical image depicting a point P positioned DX and DY offsets from the base point 300 of reference object 301 and rotated DTHETA from the axes of placement of reference object 301. Po is the interim placement point derived from the offsets DX and DY from base point 300 of reference object 301. P is the placement point derived by rotating DTHETA degrees from a line through Po and base point 300 pivoting counterclockwise from base point 300.

LO is a high level keyword statement which positions a placeable object at a new position relative to one of the line segments of a previously placed object called the reference object. The relative offsets from the previously placed line segment are specified by low level keyword statements defined in the value of the LO keyword statement. DY and RATIO are low level keyword statements defined in the LO keyword statement value and are both of type FLOAT. DY is a floating point number that specifies the distance from the previously placed line segment perpendicular to the position of the new placeable object. RATIO is a floating point number which specifies the fraction of the line segment length at which the perpendicular distance specified by DY should intersect the line segment. By specifying combinations of DY and RATIO, a placeable object may be positioned at any offset above or below a previously positioned line segment, and at any position along the length of the line segment. NUM is a low level keyword statement of type INTEGER defined in the LO keyword statement value which specifies the number of the line segment of the reference object to which DY and RATIO are to be applied. NUM can range from 1 through N or −1 through −N where N is the number of line segments in the previously placed reference object. The precise interpretation of the NUM keyword statement value depends on the value assigned to LCODE. LCODE is a low level keyword statement of type INTEGER defined in the LO keyword statement value which specifies an order in which to count the line segments that make up the reference object so as to determine which line segment is requested by the NUM keyword statement value. All placeable cables have a origin end and an opposite end furthest from the origin. The name applied to the two ends of a linear transmission device varies in the utility industries. In electrical applications the origin is referred to as the source and the opposite end as the load. In telephony the origin end is the central office and the opposite end is the field. The table below will refer to the origin and opposite ends. The meaning of NUM based on the value of LCODE is expressed below in Table 2.

TABLE 2

| LCODE | NUM |
| --- | --- |
| 0 - count by sequential order from origin end to opposite end | 1 is first segment, N is last segment, −1 is last segment, −N is first segment, 0 is first segment |
| 1 - count by length smallest to largest | 1 is shortest, N is longest, −1 is longest, −N is shortest, 0 is shortest |
| 2 - count by edge segments which clip to the edge of the graphical image | 1 through N is any segment whose opposite end is clipped to the edge, −1 through −N is any segment whose origin end is clipped to the edge, 0 is either a segment clipped on the origin end or clipped on the opposite end |
| 3 - count by association with associated reference structure | 1 through N is a segment whose opposite end is at the associate structure, −1 through −N is a segment whose origin end is at the associated structure, 0 is either a segment with the origin end or the opposite end at the associated structure |

LO is frequently used with reference to placeable cables which are drawn as a series of one or more line segments. LO may also be applied to other placeable objects as well. For non-cable placeable objects, there are four line segments numbered one through four corresponding to the four sides of the MBRR (bounding rectangle). LCODE value of 3 applies only to placeable cables.

Figure 4:
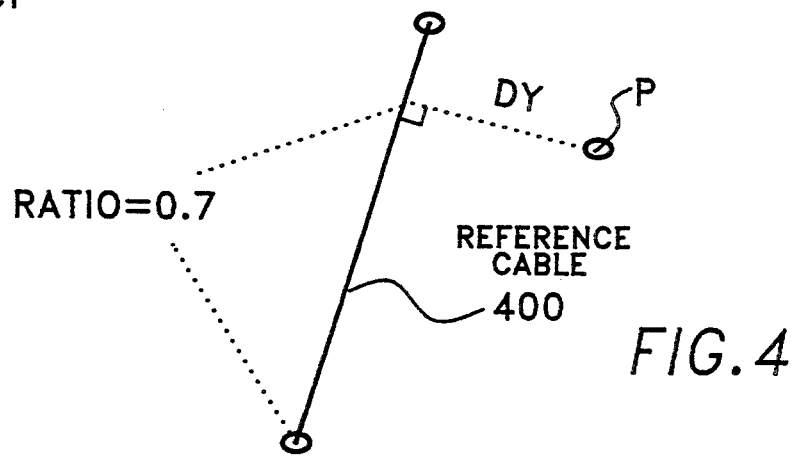
FIG. 4 is a sample graphical image resulting from the application of a Line Offset placement rule.

FIG. 4 is a sample graphical image showing an example of a placement point P which is set at a distance DY above line segment 400 and at a fraction RATIO along line segment 400.

SA is a high level keyword statement that determines the size of a symbol drawn to represent a placeable object relative to its defined nominal size drawn by drawing subsystem 104. The scale factors to be applied are defined by a combination of two low level keyword statements defined in the value of the SA high level keyword statement, namely: SX and SY. SX and SY are low level keyword statements of type FLOAT. SX and SY are floating point values that supply a size factor for the X axis and Y axis of the placeable object. The scale factors are fractions of the defined size drawn by drawing subsystem 104. For example an SX value of 0.5 shrinks the X axis dimensions of the placeable object's symbol by a factor of two in its X dimension. Scale factors greater than one may be used to magnify the nominal size of the symbol. Both SX and SY default to 1.0 if they are not specified.

AA is a high level keyword statement that determines the rotational orientation of a placeable object relative to its nominal orientation. The nominal orientation of placeable objects is that of its reference object. The rotational parameters to be applied are defined by a combination of two low level keyword statements defined in the value of the AA high level keyword statement, namely: THETA and REL. THETA is a low level keyword statement of type FLOAT. REL is a low level keyword statement of type BOOL THETA is a floating point number that specifies the angle in degrees by which the placeable object is to be rotated. REL is a boolean keyword statement that, if true, causes THETA to be added to the reference object's angle of drawing to determine the angle for placing the placeable object. If REL is false, THETA is an absolute angle from the X axis of graphical output device 106. If THETA is not specified it defaults to 0.0 degrees. If REL is not specified it defaults to true making THETA a relative angle offset by default.

GA is a high level keyword statement that alters the computation of the above location rules to move the placement point of the placeable object to intersect a vector whose origin is the reference point and whose angle results from the angle component of the placement rules. This is most useful in conjunction with Included Angle (discussed below) when the placement angle is automatically selected internally by the placement rule processing. In such a case, the user does not know in advance which angle may be chosen and so may require that the placement rule processing mechanism automatically reorient the object to be placed to match the angle selected by placement subsystem 100.

RR is a high level keyword statement that alters the placement angle of a placeable object by adding 180 degrees to the placement angle if the placement angle is between 100 and 280 degrees. This is useful to assure that text blocks are placed so that the text remains readable from the one side of the drawing regardless of the placement of the associated reference object. RR accepts STYLE as a low level keyword statement of type INTEGER. STYLE keyword statement value of 0 specifies that the 180 degree flip should occur about the centerline of the MBRR of the object being placed. STYLE keyword statement value of 1 specifies that the 180 degree flip should occur about an axis offset from the centerline of the MBRR of the object being placed.

Remote area, Included Angle, and Rapera Segment

In addition to the PG group of placement rules described above, other rules may be applied for special purpose placement of objects.

Remote Area (RA) is a high level keyword statement to be used in place of the PG rule set to position placeable objects in a remote area in the upper right corner of the graphical image. One skilled in the art will recognize that the remote area may be defined as any area of the graphical image appropriate to the industry and application. Since the location is fixed in the upper right corner, Location Agents (described above) are not used. This area of the image aligns all text in columns and always orients objects at 0 degrees from the nominal X axis of graphical output device 106, therefor Angle Agent (AA described above) is not used. Only the SA scale agent rule described above may be specified within the RA high level keyword statement. Because of the remote positioning of an object placed with the application of this rule, Placeable Leaders (PL described below) are frequently used in conjunction with this rule.

Included Angle (IA) is a high level keyword statement used to specify positioning of placeable devices at splice points. IA automatically tries several angles in the vicinity of the reference object to position the object to be placed, therefor AA is not used with this keyword statement. Within the IA keyword statement, FP, LO, SA, GA, and RR may be specified to modify the positioning of the placeable device. In particular, Agree Angle (GA) described above is useful in conjunction with IA to move the placement point to a point on a vector through the reference point extending at the angle determined by the IA keyword statement rule.

Repeat Segment (RG) is a high level keyword statement that repeatedly applies rules to line segments until a successful placement is found. Only the LO Location Agent is utilized with the RG keyword statement. LCODE keyword statement values of 2 and 3 (within the LO keyword statement) should be avoided in the context of the RG keyword statement. Within the RG keyword statement, LO, SA, and RR may be specified to modify the positioning of the placeable device.

Placeable Leaders

In conjunction with any of the above placement rules, the user may specify the Placeable Leader (PL) high level keyword statement. Any of the above rules, and in particular the Remote Area (RA) keyword statement, can result in moving a placeable object away from it's reference object to such an extreme that their original association is no longer visually evident on the graphical image created. PL specifies that a text and associated lines or symbols be drawn to indicate the logical relationship of two placeable objects on the graphical image created. If a rule succeeds in placing an object which contains a PL keyword statement, then placement of the object creates a PL object which itself must be placed. This is analogous to the creation and placement of text blocks discussed below. PL accepts Drawing Primitives DS, TS, and LS for drawing the leader object, Overplot Agent (OA) to determine overplot attributes of the leader object, and the Scale Agent (SA) component of the Placement Group (PG) keyword statements to size the leader object.

Drawing Primitives

Each placeable object keyword statement as discussed above includes a drawing primitive high level keyword statement to specify which of three types of drawings to use to represent the placeable object. Additional keyword statements defined within each drawing primitive keyword statements provide information relevant to drawing subsystem 104. Those skilled in the art will recognize that the drawing parameters specified within the drawing primitive keyword statements as well as the drawing primitives themselves may be easily adapted to the requirements of other drawing subsystems.

DS is a high level keyword statement which specifies the use of a drawn symbol to represent the placeable object on the graphical image. Keyword statements defined within the value of the DS keyword statement specify further details of the parameters to be used to draw the placeable object. ID is a low level keyword statement of type STRING defined within the DS keyword statement to specify the character string identifier of the symbol to be drawn representing the placeable object. The identifier may be a file name or a symbol name within a symbol library depending on the specific needs of drawing subsystem 104 as utilized by placement subsystem 100. COLOR is a low level keyword statement of type INTEGER defined within the DS keyword statement to specify the color of the drawn symbol on the graphical image. If this value is not specified a default value of 1 is presumed to indicate the color black. The values used to represent other colors are dependant upon the requirements of drawing subsystem 104 as utilized by placement subsystem 100. LAYER is a low level keyword statement of type INTEGER defined within the DS keyword statement to specify the graphical layer to be assigned the drawn symbol. The use of layers to display or hide various levels of detail on the graphical image is a function dependant upon the requirements of drawing subsystem 104 as utilized by placement subsystem 100. If no value is specified, a default value of 255 is assumed.

LS is a high level keyword statement used to specify that one or more line segments are to be drawn to represent the placeable object on the graphical image. Keyword statements defined within the value of the LS keyword statement specify further details of the parameters to be used to draw the placeable object. COLOR is a low level keyword statement of type INTEGER defined within the LS keyword statement to specify the color of the drawn line segment on the graphical image. If this value is not specified a default value of 1 is presumed to indicate the color black. The values used to represent other colors are dependant upon the requirements of drawing subsystem 104 as utilized by placement subsystem 100. LAYER is a low level keyword statement of type INTEGER defined within the LS keyword statement to specify the graphical layer to be assigned the drawn line segment. The use of layers to display or hide various levels of detail on the graphical image is a function dependant upon the requirements of drawing subsystem 104 as utilized by placement subsystem 100. If no value is specified, a default value of 255 is assumed. LSTYLE is a low level keyword statement of type INTEGER defined within the LS keyword statement to specify the style of line segment to be drawn. If this value is not specified, a default value of 1 is assumed to represent a solid line style. Values used to represent other line styles are dependent on the requirements of drawing subsystem 104 as utilized by placement subsystem 100.

TS is a high level keyword statement used to specify that a text string is to be drawn to represent the placeable object on the graphical image. Keyword statements defined within the value of the TS keyword statement specify further details of the parameters to be used to draw the placeable object. COLOR is a low level keyword statement of type INTEGER defined within the TS keyword statement to specify the color of the drawn text string on the graphical image. If this value is not specified a default value of 1 is presumed to indicate the color black. The values used to represent other colors are dependant upon the requirements of drawing subsystem 104 as utilized by placement subsystem 100. LAYER is a low level keyword statement of type INTEGER defined within the TS keyword statement to specify the graphical layer to be assigned the drawn text string. The use of layers to display or hide various levels of detail on the graphical image is a function dependant upon the requirements of drawing subsystem 104 as utilized by placement subsystem 100. If no value is specified, a default value of 255 is assumed. FONT is a low level keyword statement of type INTEGER defined within the TS keyword statement to specify the character typeface to be used in drawing the text string. If no value is specified for this parameter, a default value of 1 is presumed. The mapping of FONT keyword statement values to typeface styles is dependent on the requirements of drawing subsystem 104 as utilized by placement subsystem 100. CHEIGHT, CWIDTH, and CSPACE are all low level keyword statements of type FLOAT defined within the TS keyword statement to specify the character height, character width, and inter-character spacing respectively.

Placeable Objects, Specific Features

With the preceding as a foundation, the details of each of the several placeable objects may now be easily understood by those skilled in the art. The keyword statements described above generally operate as discussed with minor exceptions where noted below. Each placeable object keyword statement also has unique properties and parameters represented by addition keyword statements as discussed in more detail below.

Placeable Structures

Placeable structure PS keyword statements appear as first level keyword statements with the common elements described above for all placeable objects. Placeable structures typically specify one or more DS symbol drawing keyword statements to invoke the symbol drawing features of placement subsystem 100 in drawing the placeable symbol on the graphical image. Only the Scale Agent (SA) component of the PG placement rule may be applied to a placeable structure because its location and placement angle is fixed to a geographic position coded in the information record retrieved from database subsystem 102.

In addition to the common elements of all placeable objects the placeable structure keyword statement contains structure point agent keyword statements which define certain attributes unique to a placeable structure. Structure point agent keyword statements serve to define how placeable cables visually connect to several of the placeable structures on the graphics image. Frequently several placeable cables connect to one point near a placeable structure. The special rules defined by these structure point agents control the drawing of the cables as they graphically join with the placeable structure. Every placeable structure keyword statement must define one of the structure point agents in its value definition.

OP is a high level keyword statement which defines a structure point agent within the definition of PS keyword statement The OP keyword statement specifies connection of cables to a series of points offset from the base point of a placeable structure. This approach is used to depict placeable cables connecting at a point offset from a point of the structure so as to not obscure the structure on the graphical image.

Figure 5:
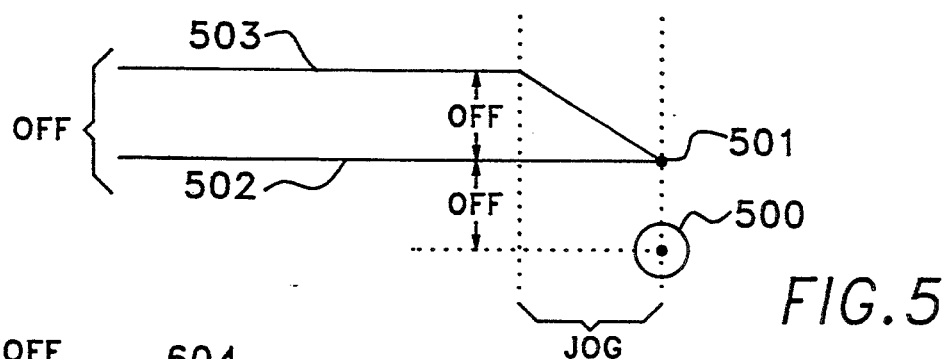
FIG. 5 is a sample graphical image resulting from the application of an Offset Point structure point agent placement rule.

The OP keyword statement may contain the following keyword statements. OFF is a low level keyword statement of type FLOAT defined within the OP keyword statement to specify the distance between parallel cable segments. If no value is specified for this keyword statement, a default value of 6.0 is presumed. JOG is a low level keyword statement of type FLOAT defined within the OP keyword statement to specify a distance from a point on the placeable structure at which the line segment representing the cable should stop its graphical drawing parallel to other cables and jog at an angle directly to a point related to the placeable structure. FIG. 5 shows a sample graphical image indicating the distance labeled OFF between two parallel cables 502 and 503 joining with connection point 501 on placeable structure 500. The distance labeled JOG indicates the distance at which parallel cables 502 and 503 stop their parallel relative orientation and jog to meet connection point 501.

Figure 6:
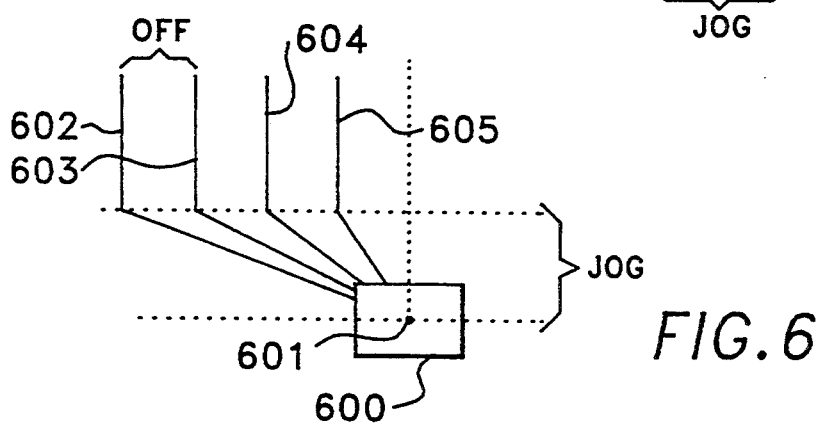
FIG. 6 is a sample graphical image resulting from the application of an Connection Point structure point agent placement rule.

CP is a high level keyword statement which defines a structure point agent within the definition of PS keyword statement The CP keyword statement specifies connection of cables to points along the perimeter of the symbol drawn to represent a placeable structure. This approach is used to depict cables drawn to join and connect at the a point of the structure. Similar to OP described above, the cables are drawn parallel to one another, then jog to join at the base point of the placeable structure. Unlike OP above, the cables are clipped at their respective intersections with the perimeter of the symbol drawn to represent the placeable object. The CP keyword statement may contain the following keyword statements. OFF is a low level keyword statement of type FLOAT defined within the CP keyword statement to specify the distance between parallel cable segments. If no values is specified for this keyword statement, a default value of 6.0 is presumed. JOG is a low level keyword statement of type FLOAT defined within the CP keyword statement to specify a distance from a point on the placeable structure at which the line segment representing the cable should stop its graphical drawing parallel to other cables and jog at an angle directly to the base point of the placeable structure. FIG. 6 shows a sample graphical image indicating the distance labeled OFF between each adjacent pair of parallel cables 602 through 605 joining with connection point 601 on placeable structure 600. The distance labeled JOG indicates the distance at which parallel cables 602 through 605 stop their parallel orientation and jog to converge at base point 601. Rather than continue through the perimeter of placeable structure 600 to base point 601, cables 602 through 605 are clipped at their respective intersections with the outer perimeter of placeable structure 600.

RP is a high level keyword statement which defines a structure point agent within the definition of PS keyword statement The RP keyword statement specifies connection of all cables to the base point of the placeable structure without offset distance between cables or a jog point. This means multiple cables between two placeable structures will overplot one another. CLIP is a low level keyword statement of type BOOL defined within the RP keyword statement to specify, if true, that the joining cables should be clipped at their intersection with the perimeter of the symbol representing the placeable structure. Otherwise, joining cables are drawn extending through the perimeter of the placeable structure to the base point of the structure. This feature is identical to the clipping feature of the CP keyword statement described above.

Placeable Cables

Placeable cable PC keyword statements appear as first level keyword statements with the common elements described above for all placeable objects. Although PC is discussed herein as a placeable object, their placement is always determined by the placement of the objects to which they connect, namely PC, PB, and PS. Placeable cables typically specify the LS line segment drawing keyword statement to invoke the line segment drawing features of placement subsystem 100 in drawing the placeable cable on the graphical image. Only the Scale Agent component of the PG placement rule may be applied to a placeable cable because its location is fixed by the structures to which the placeable cable connects. The Scale Agent if specified is only applied to splice symbols if used (see below). The ends of cables are joined to other objects with splice symbols. The information record retrieved from database subsystem 102 for each cable specifies the type code of the splice to be drawn. In addition, the information record retrieved supplies two or more reference structures. A line segment is drawn between each pair of reference structures. Details of the connection to the reference structures are determined by the structure point agent keyword statements described above. The SPLICE first level keyword statement specifies the drawing parameters used for the splice symbols (see below).

Placeable Devices

Placeable device PD keyword statements appear as first level keyword statements with the common elements described above for all placeable objects. Placeable devices attach to placeable cable reference objects at related placeable objects. Placeable devices typically specify the DS symbol drawing keyword statement to invoke the symbol drawing features of placement subsystem 100 in drawing the placeable device on the graphical image. Included Angle (IA) (described above) is useful in positioning placeable devices to automatically try several angles around a connection point.

Placeable Leaders (PL), discussed above, are frequently used in conjunction with Placeable Devices (PD) because a multitude of such devices are often placed at a Placeable Structure (PS). Placeable Leaders (PL) are used to help clarify the intended relationship between the two objects though the placement rules may position the device symbol away from the related structure.

Placeable Connection boxes

Placeable connection boxes PB keyword statements appear as first level keyword statements with the common elements described above for all placeable objects. Placeable connection boxes typically specify the DS symbol drawing keyword statement to invoke the symbol drawing features of placement subsystem 100 in drawing the placeable connection box on the graphical image.

In addition to the common elements of all placeable objects, the placeable connection box keyword statement contains keyword statements which define certain attributes unique to a placeable connection box. Connection box connection keyword statements serve to define how placeable cables visually connect to a central office side of the connection box and to a field side of the connection box on the graphics image. COPT and FLDPT are high level keyword 10 statements defined within the PB keyword statement to specify the location for attaching cables to the connection box central office side and the field side respectively. DX and DY ar both low level keyword statements of type FLOAT defined within COPT or FLDPT keyword statements to specify the X axis and Y axis displacement, respectively, to the base point on the connection box for central office side or field side cable connections. The X and Y axes are relative to the connection box symbol as placed on the graphical image.

Splice

SPLICE keyword statements appear as first level keyword statements. Splice keyword statements specify the symbols to be used to for the field side, central office side, and base portion of a cable splice. IN, OUT, .and BASE are all high level keyword statements defined within the SPLICE keyword statement to specify parameters for drawing the field side, central office side and base portion, respectively, of a splice. IN, OUT, and BASE all recognize the same low level keyword statement parameters. ID is a low level keyword statement of type STRING defined within the IN, OUT, or BASE keyword statement to specify the character string identifier of the symbol to be drawn representing the corresponding portion of the splice. The identifier may be a file name or a symbol name within a symbol library depending on the specific needs of drawing subsystem 104 as utilized by placement subsystem 100. COLOR is a low level keyword statement of type INTEGER defined within the IN, OUT, or BASE keyword statement to specify the color of the drawn symbol on the graphical image. If this value is not specified a default value of 1 is presumed to indicate the color black. The values used to represent other colors are dependant upon the requirements of drawing subsystem 104 as utilized by placement subsystem 100. LAYER is a low level keyword statement of type INTEGER defined within the IN, OUT, or BASE keyword statement to specify the graphical layer to be assigned the drawn symbol. The use of layers to display or hide various levels of detail on the graphical image is a function dependant upon the requirements of drawing subsystem 104 as utilized by placement subsystem 100. If no value is specified, a default value of 255 is assumed. TYPE is a low level keyword statement of type STRING defined within the IN, OUT, or BASE keyword statement to specify a symbol to be drawn indicating the type of the cable splice. Single letters are typically used in TYPE such as "T" for theoretical and "A" for arrowhead.

Placeable Cables (PC) have information in the records of database subsystem 102 indicating the type of splice to be used on each end of the cable. That type code corresponds to the TYPE keyword statement described above. This type code match serves to identify the symbol used for the splice of the placeable cable.

Graphic Background Features

When placement subsystem 100 is started by the user, information may be supplied to placement subsystem 100 describing objects representing fixed features of the map being generated. These feature are presumed by placement subsystem 100 to be previously placed. These features may be integrated with the overplot and placement rules of the placement subsystem 100 by specifying necessary information to the overplot computations. The geographic positions of these previously placed graphic background features must be supplied by the user through initialization information or files supplied when placement subsystem 100 is started.

PN and PE keyword statements are first level keyword statements that utilize only the overplotting definitions common to other first level keyword statements. OA (overplot agent) high level keyword statements are defined within the PN or PE keyword statements to define the overplot parameters for the PN and PE objects. Only the OID keyword statement of OA is meaningful in this context since the previously place graphic background features cannot (by definition) attempt to overplot other objects. PN objects are text features previously placed on the graphical image before placement subsystem 100 is started. PE objects are graphic features (such as street center lines) previously placed on the graphical image before placement subsystem 100 is started.

Text Block

A text block TB keyword statement is similar in most respects to the first level keyword statements described above. TB recognizes the same set of common parameters (except for TB itself, see Placeable Objects, Common Features discussion above). However, a text block is not placed on the graphical image in isolation. The TB keyword statement and the resulting text placed on the graphical image is coupled to an associated first level placeable object. Text blocks specify the TS text string drawing keyword statement to invoke the text drawing features of placement subsystem 100 in drawing the placeable text block on the graphical image.

In addition to the common elements of all placeable objects, the placeable text block keyword statement contains text block specific keyword statements which define certain attributes unique to a placeable text block. FIXEDF is a low level keyword statement of type STRING defined within a TB keyword statement which specifies the format for printing the text information retrieved from database subsystem 102 due to the application of the query specified by the SOL keyword statement value in the TB keyword statement. The text information is transformed according the format defined by the FIXEDF keyword statement value then placed on the graphical image and drawn using the drawing primitives specified in the TB keyword statement. The value of the FIXEDF keyword statement is a STRING which is similar in content to a format string in the C programming language. Characters in the FIXEDF character string represent either constant text to be drawn or conversion characters if preceded by a '%' character. The conversion characters represent a variable piece of text to be drawn according to the meaning of the conversion character. The particular value to be drawn in place of the conversion character is a piece of text information retrieved from database subsystem 102.. Those skilled in the art will understand the flexibility of a format conversion string of this type in converting and drawing text information.

In addition to the text information retrieved by use of the SQL keyword statement query, the TB keyword statement may apply a repetitive query to retrieve additional information associated with the text block. This feature is applied when, for example, a text block is to be drawn which lists textual information in a tabular form. An additional repeated query is specified by the low level STRING type keyword statement RSQL. The information retrieved from database subsystem 102 due to each repetitive application of the RSQL keyword statement query is transformed according to the format specified by the low level STRING type keyword statement REPEATF. The REPEATF keyword statement is similar to the FIXEDF keyword statement described above for converting the text information to be drawn.

The text retrieved by the repetitive application of the RSQL keyword statement query string may be subdivided into columns with each column containing one or more of the repetitively retrieved pieces of text information. Text information retrieved by application of the RSQL keyword statement value query is organized into sub-blocks of the text block. A sub-block is defined to be all retrieved text information which shares a common value on one of the fields of the RSQL query. COLUMN is a low level keyword statement of type INTEGER defined within the TB keyword statement to specify that the text sub-blocks are to be placed and drawn in column format. A default COLUMN keyword statement value of zero indicates that all text sub-blocks are to be placed and drawn in a single column. Non-zero COLUMN keyword statement values, N, indicate that the text sub-blocks are to be placed and drawn with N sub-blocks per column. If the COLUMN keyword statement value specifies the use of multiple columns, the user may specify that a header be placed and drawn at the top of each column. HATTR is a low level keyword statement of type INTEGER defined within the TB keyword statement to indicate which field retrieved by the repetitive application of the RSQL query is to determine the division of sub-blocks. HEADINGF is a low level keyword statement of type STRING defined within the TB keyword statement to specify the conversion of the text which will be placed and drawn as the column heading. The HEADINGF keyword statement is similar in function to the FIXEDF keyword statement described above.

JUST is a low level keyword statement of type INTEGER defined within the TB keyword statement to specify the justification of the text information placed and drawn. The JUST keyword statement may have values 0 through 4. The meaning of the values are most easily understood by way of example text. The vertical line near each example indicates a perpendicular to the placement angle of the text block intersecting that placement angle line at the placement point determined by the placement rules of the text block.

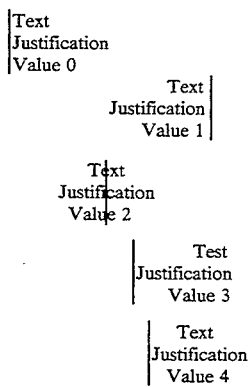

If the Remote Area (RA) placement rule is used in the text block, justification style 1 is drawn as though style 3 was selected and similarly style 2 is drawn as though style 4 was selected. One skilled in the art will recognize that the methods and structures of the present invention could be extended to include vertically oriented positioning and justification of text blocks.

LSPACE is a low level keyword statement of type FLOAT defined within the TB keyword statement to specify the distance between lines of text drawn in by the TB keyword statement.

Keyword Statement Summary

To aid in understanding the syntax and semantic meaning of the keyword statements described above, the following tables are presented. The first, Table 3, describes each high level keyword statement described above. The first group of keyword statement in Table 3 are the so called first level keyword statements which are not nested within other keyword statements. The second group is the high level keyword statements which are nested within other keyword statements. The first column is the keyword statement name as it appears in the rule specification file created by a user of placement subsystem 100. The Repeat column is marked if the keyword statement may usually be repeated in the rule specification file as described above with reference to the REPEATABLE attribute of keyword statements. The Group column is marked to indicate that the keyword statement is a member of a GROUPED class of keyword statements as described above. The letter used to mark the Group column indicates that all other keyword statements with the same marking character in the Group column are members of the same GROUPED class. The Default column is marked if the keyword statement has a default semantic if not specified within the rule specification file as described above with reference to the DEFAULTS keyword statement attribute. The Optional column is marked to indicate that the keyword statement is optional in the rule specification file and may usually does not provide a default semantic as described above with reference to the OPTIONAL attribute of keyword statements. Full details of each keyword statement are discussed above.

TABLE 3

| Keyword Statement | Repeating | Group | Default | Optional |
|---|---|---|---|---|
| PS | x | | | |
| PC | x | | | x |
| PD | x | | | x |
| PB | x | | | |
| SPLICE | x | | | x |
| PN | | | | x |
| PE | | | | x |
| TB | x | | | x |
| PG | x | A | | x |
| OA | | | x | |
| LO | | B | | x |
| FP | | B | x | x |
| RA | x | A | | x |
| IA | x | A | | x |
| RG | x | A | | x |
| AA | | | x | |
| SA | | | x | |
| RR | | D | | x |
| GA | | D | | x |
| PL | | | | x |
| LS | x | | | |
| DS | x | | | |
| TS | x | | | |
| RP | | C | | x |
| OP | | C | x | x |
| CP | | C | | x |
| IN | | | | x |
| OUT | | | | x |
| BASE | | | | x |
| COPT | | | | x |
| FLDPT | | | | x |

The next table, Table 4, presents the low level keyword statements discussed above in detail. As above, the first column is the name of the keyword statement as entered by a user in the rule specification file. The second column is the default value of the keyword statement, if any, as described above with reference to the DEFAULTS attribute of keyword statements. The last column is the type of the keyword statement as described above. Full details of each keyword statement are discussed above.

TABLE 4

| Keyword Statement | Default | Format |
|---|---|---|
| OID | 0 | INTEGER |
| OMASK | 0xffffffff | INTEGER |
| LSTYLE | 1 | INTEGER |
| COLOR | 1 | INTEGER |
| LAYER | 255 | INTEGER |
| FONT | 1 | INTEGER |
| JUST | 0 | INTEGER |
| HATTR | | INTEGER |
| COLUMN | 0 | INTEGER |
| STYLE | 0 | INTEGER |
| LCODE | 0 | INTEGER |
| NUM | 0 | INTEGER |
| SQL | | STRING |
| ID | | STRING |
| FIXEDF | | STRING |
| REPEATF | | STRING |
| HEADINGF | | STRING |
| RSQL | | STRING |
| TYPE | | STRING |
| THETA | 0.0 | FLOAT |
| DX | 0.0 | FLOAT |
| DY | 0.0 | FLOAT |
| SX | 1.0 | FLOAT |
| SY | 1.0 | FLOAT |
| DTHETA | 0.0 | FLOAT |
| RATIO | 0.5 | FLOAT |
| CHEIGHT | 10.0 | FLOAT |
| CWIDTH | 6.6 | FLOAT |
| CSPACE | 1.0 | FLOAT |
| LSPACE | 2.0 | FLOAT |
| JOG | 3.0 | FLOAT |
| OFF | 6.0 | FLOAT |
| REL | T | BOOL |
| CLIP | F | BOOL |

The following outline further assists in understanding the structure of, and relationships between, the keyword statements. In the following outline, each high level keyword statement is presented on a line followed by zero or more indented lines, one for each keyword statement or keyword statement group which is acceptable in the definition of the value of the corresponding high level keyword statement. Where alternative grouped keyword statements are accepted, the grouped keyword statements are listed on one line separated by the character '/'. In other words, the line A/B/C indicates that one of A, or B, or C may be specified.

```
PS
    SQL
    DS
    OA
    PG
    RA
    IA
    RG
    OP/CP/RP
    TB
PC
    SQL
    LS
    OA
    PG
    RA
    IA
    RG
    TB
```

```
PD
    SQL
    DS
    OA
    PG
    RA
    IA
    RG
    TB
PB
    SQL
    COPT
    FLDPT
    DS
    OA
    PG
    RA
    IA
    RG
    TB
SPLICE
    IN
    OUT
    BASE
    TYPE
PE
    OA
PN
    OA
TB
    SQL
    FIXEDF
    RSQL
    REPEATF
    HATTR
    COLUMN
    HEADINGF
    LSPACE
    JUST
    TS
    OA
    PG/RA/IA/RG
PG
    FP/LO
    AA
    SA
    RR/GA
    PL
RA
    SA
    PL
IA
    FP/LO
    RR/GA
    SA
    PL
RG
    LO
    AA
    RR/GA
    SA
    PL
PL
    DS
    TS
    LS
    OA
    PG
AA
    THETA
    REL
RR
    STYLE
GA
SA
    SX
    SY
FP
    DX
    DY
    DTHETA
LO
    DY
    RATIO
    LCODE
    NUM
DS
    ID
    COLOR
    LAYER
TS
    CHEIGHT
    CWIDTH
    CSPACE
    COLOR
    FONT
    LAYER
LS
    COLOR
    LSTYLE
    LAYER
OA
    OID
    OMASK
OP
    OFF
    JOG
CP
    OFF
    JOG
RP
    CLIP
IN
    ID
    COLOR
OUT
    ID
    COLOR
BASE
    ID
    COLOR
COPT
    DX
    DY
FLDPT
    DX
    DY
```

. Method of Placement

The syntax and semantics of entries in the rule specification file has been discussed in some detail above. A user starts placement subsystem 100 by entering commands at KVDU 210, supplying placement subsystem 100 the rule specification file, and providing information regarding location of previously drawn graphic background features as discussed above. Placement subsystem 100 then 10 processes the information in the rule specification file in conjunction with information retrieved from database subsystem 102. Information regarding previously placed graphic background features of the area to be mapped is also used to prevent overplotting of these background features. Completion of the processing according to the following methods creates a map with all objects placed according to the drafting placement rules specified by the user.

Figure 7:
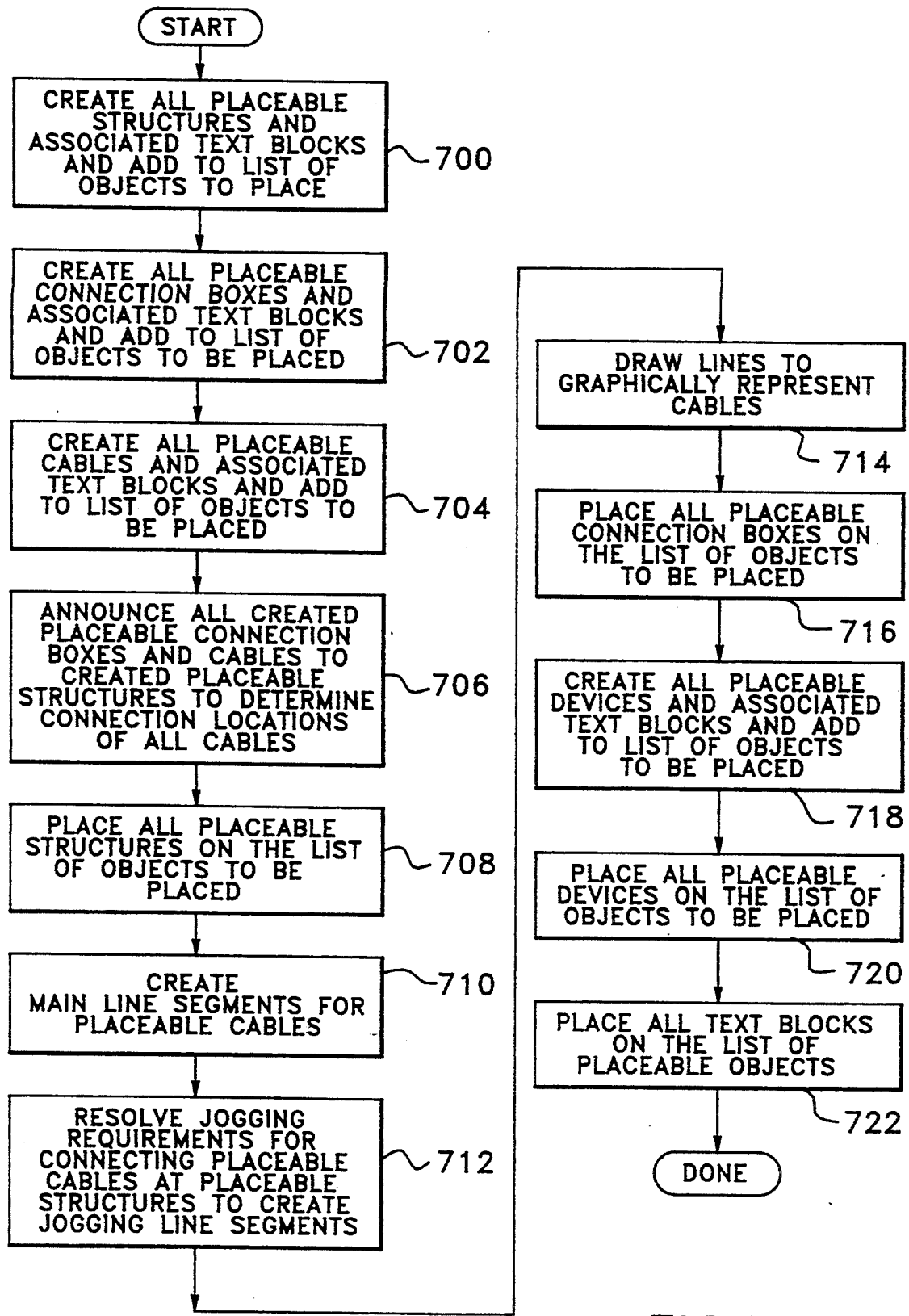
FIG. 7 is a flowchart of the method applied by the placement subsystem of the present invention.

FIG. 7 is a flowchart of the method applied by placement subsystem 100 to generate the graphical image.

Elements 700 through 704 are effective to create a list of actual placeable objects from the rule specification file and database subsystem 102. Each PS, PB, and PC keyword statement in the rule specification file includes an SOL keyword statement whose STRING type value is a query to be applied to database subsystem 102. Each information record retrieved by application of each SOL query from each PS, PB, and PC keyword statement causes the creation of another placeable structure, placeable connection box, or placeable cable, respectively, collectively referred to as actual placeable objects. Each actual placeable object carries with it the common parameters expressed in the keyword statements of the corresponding entry in the rule specification file but also has the unique parameters for identification number, nominal preferred placement, and attachment to other actual placeable objects. Essentially each PS, PB, and PC keyword statement entry in the rule specification files serves as a prototype for the creation of zero or more actual placeable objects. It should be further understood that the rule specification file constructed by the user may contain zero or more of each of PS, PB, and PC keyword statement entries, each supplying a prototype for creation of actual placeable objects. Each created actual placeable object (hereinafter referred to as APO) is added to a list of APOs. As each placeable object is created the TB keyword statement within the PS, PB, or PC keyword statement is processed to create zero or more text block placeable objects. Any placeable text objects so created are added to the list of APOs to be placed.

Element 706 processes the list of APOs to be placed and "announces" the creation of cable and connection box APOs on the list to the associated structure APOs on the list. The placeable structures are used to gather information regarding cables attached to the placeable structure and connection boxes relating to the placeable structures. As used herein, "announce" means to save information within the APO for a structure to which a cable or connection box APO is associated. After processing of this element 706, each placeable structure APO on the list of objects to be placed will contain complete information regarding the number of cables and boxes associated with the structure. This information is used in subsequent elements to determine appropriate connection positions for the boxes and cables at each placeable structure.

Element 708 is effective to place all structure APOs on the graphical image. Structure APOs are placed first because they serve as the reference objects for most other APOs to be placed and more importantly and they do not depend on any other object as a reference object. When a proper placement is determined by operation of this element, the drawing primitive keyword statement of the placed APO is retrieved and the appropriate drawing operations are invoked to draw a representation of the structure on the graphical image.

Element 710 uses the information derived in element 706 to resolve or determine the preferred connection point for each cable attached to each structure and connection box. Cables are not placed according to the placement rules as are other placeable objects. Instead their position is determined by the requirements of the structures and connection boxes to which the cables are connected. This element determines the placement of the main line segments which represent the cables.

Element 712 uses the information derived in elements 706 and 710 to resolve or determine the type, length and position of the jogged segments at the connection ends of each cable. Completion of processing by elements 710 and 12 completely determines the placement of all segments of every cable.

Element 714 determines the drawing primitives in the APO for each cable on the list of APOs to be placed and invokes the drawing primitives to draw the line segments for each cable and for each splice at the connection ends of each cable.

Element 716 is effective to place all connection box APOs on the graphical image. When a proper placement is determined by operation of this element, the drawing primitive keyword statement of the placed APO is retrieved and the appropriate drawing operations are invoked to draw a representation of the connection box on the graphical image.

Element 718 is effective to create APOs from the rule specification file and database subsystem 102 for each PD keyword statement. This element is identical to the processing performed by elements 700 through 704 except that only placeable device (PD) APOs are created by processing of this step. Each created PD APO is added to a list of APOs. As each PD APO is created the TB keyword statement within the PD keyword statement is processed to create zero or more text block placeable objects. Any placeable text objects so created are added to the list of APOs to be placed.

Element 720 is effective to place all device APOs on the graphical image. When a proper placement is determined by operation of this element, the drawing primitive keyword statement of the placed APO is retrieved and the appropriate drawing operations are invoked to draw a representation of the device on the graphical image.

Element 722 is effective to place all text block APOs on the graphical image. When a proper placement is determined by operation of this element, the drawing primitive keyword statement of the placed APO is retrieved and the appropriate drawing operations are invoked to draw a representation of the text block on the graphical image.

This completes the operation of placement subsystem 100 and results in producing the graphical image with all objects placed according to the rules designed by the user of the system.

Figure 8:
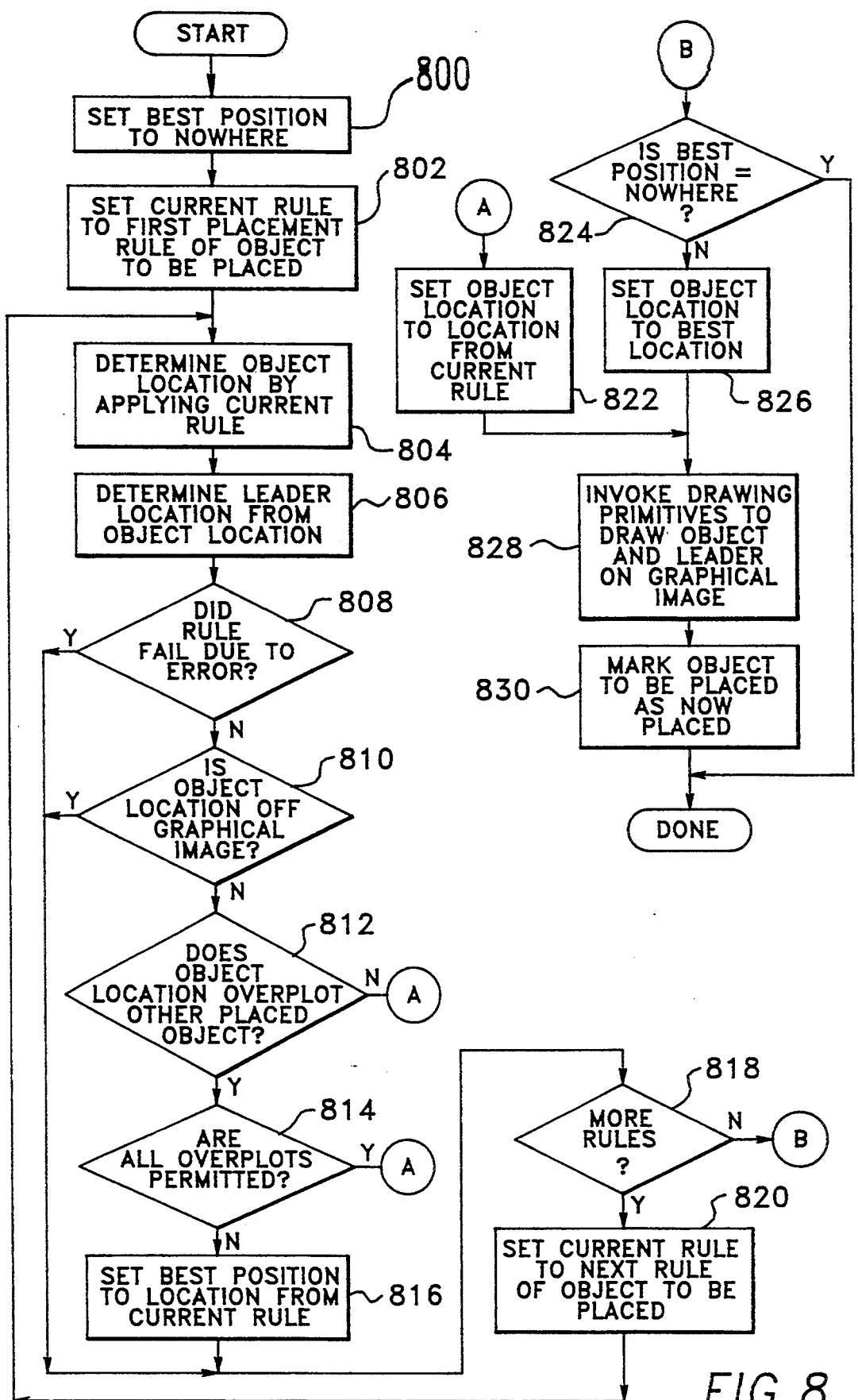
FIG. 8 is a flowchart depicting additional detail of the application of placement rules in the method applied by the placement subsystem of the present invention.

FIG. 8 is a flowchart showing more detail of the methods applied by placement subsystem 100 in placing an APO. The method shown in FIG. 8 is an exemplary method for placing and drawing one APO. The methods presumes it is supplied with the APO to be placed and with the list of APOs to be placed as discussed above with reference to FIG. 7. The method may be invoked repetitively to place all APOs on the graphical image.

Element 800 initializes the best position to nowhere. The best position will be used if no successful placement can be made by application of the rules to place the object being placed.

Element 802 initializes a current rule value to the first placement rule keyword statement in the APO to be placed.

Element 804 determines the location of the APO to be placed by applying the current rule. The location results from the application of the current rule but the APO is not placed and drawn in that position yet. This element determines the location by computing an absolute position of the APO using the current rule applied relative to the previously placed reference object referenced by the APO to be placed.

Element 806 determines the location of the placeable leader, if any, associated with the APO. This location results from the application of the current rule of this APO and the parameters and rules specified in the PL keyword statement of the current rule.

Element 808 determines whether the application of the rules applied in elements 804 and 806 were applied without error. The rules may not be applied correctly to every APO since the rules are generalized to place a class of objects. The rule could fail to apply correctly if, for example, the information required to apply the rule is incorrect or unavailable in the information record retrieved from database subsystem 102 when creating the APO as described above with reference to FIG. 7. If the rule was applied without error processing continues at element 810. Otherwise, processing continues with element 818.

Element 810 determines if the positions computed in elements 804 and 806 would place the APO outside the graphical image. This comparison is done by determining the maximum possible extent of the APO to be placed in all directions from the absolute positions computed in elements 804 and 806. The MBRR (bounding box described above) of the APO may be used for this purpose. If any portion of the maximum possible extent of the APO crosses the edge of the graphical image area, then the APO position computed in elements 804 and 806 cannot be used, the current rule fails outright and the method continues at element 818. If the maximum extent of the APO in all directions remains within the boundaries of the graphical image, then the current rule remains a candidate for properly placing the APO and the method continue to element 812.

Element 812 determines whether the maximum extent of the APO might overplot the maximum extent of any other APO already placed. To determine this, the element compares the MBRR of the APO to be placed with the MBRR for each placeable object on the list already placed on the graphical image. If no part of the APO to be placed overplots any previously placed object on the list the current rule succeeds and the method continues at element 822 by placing and drawing the APO to be placed. If any part of the APO to be placed overplots any previously placed object on the list the method continues with element 814.

Element 814 determines if the APO to be placed is allowed to overplot the previously placed objects which it is found to be overplotting by operation of element 812. The OID keyword statement from the previously placed objects and the OMASK keyword statement from the APO to be placed are used to determine if overplotting is allowed (see discussion above regarding Overplotting). If the overplotting is allowed, then the current rules successfully places the APO to be placed and the method continues at element 822 by placing and drawing the APO to be placed. If the overplot is disallowed, then the current rule fails, though not outright, and the method continues at element 816.

Element 816 sets the best location to the location computed from the application of the current rule. Though the current rule failed due to disallowed overplotting, it may be used as the default position if all remaining rules fail outright. The best position saves the location computed by application of the last failing rule for the possibility that no rule will succeed.

Element 818 determines if there are more placement rules yet to be tried in the APO to be placed. If so then processing continues with element 820. If not, then processing continues with element 824.

Element 820 sets the current rule to the next placement rule of the APO to be placed. The method continues with element 804 repeating the above steps until the APO is successfully placed or all placement rules of the APO to be placed have been tried.

Element 822 sets the placement location for the APO to be placed to the location determined in element 804 by application of the current rule. Processing continues with element 828.

Element 824 determines whether the best location is still set to nowhere. If so then all placement rules of the APO to be placed failed outright. The APO cannot be placed on the graphical image and the method is finished. If the best position is no longer equal to nowhere, then no rule succeeded, but at least one rule did not fail outright and the method continues with element 826.

Element 826 sets the location of the object to be placed to the best location last saved in element 816. This location, computed by the application of the last failed placement rule attempted in placing the APO, is used as a default location.

Element 828 invokes the drawing primitive called for in the keyword statements of the APO to be placed. In addition, the drawing primitives for any associated placeable leaders are invoked at this time to draw the graphical representation of the leader on the graphical image. These drawing primitives, as discussed above, may be either direct function calls to drawing subsystem 104 of FIG. 1 to create the graphic image on graphical output device 106, or may be remote communications applying well known client/server network computing models. In either exemplary embodiment, this element serves to draw the objects onto the graphical image.

Element 830 marks the APO to be placed as now placed. As this method is repetitively applied to place other objects, the APO just placed by application of the above elements will be seen as a previously placed object when determining overplot characteristics of the next APO to be placed. This element completes the processing of the methods to place one object on the graphical image.

It is expressly understood that the claimed invention is not to be limited to the description of the preferred embodiment but encompasses other modifications and alterations within the scope and spirit of the inventive concept. It is expressly understood that the invention may be embodied on a single computing system or a plurality of networked computers, that communication links may be through direct function calls, interprocess communication means, or network communication means, that the input to placement subsystem 100 may comprise operator interactive means, records or files stored on a storage medium, network communication means or other client/server computing means for providing data to placement subsystem 100.

We claim:

1. An apparatus for creating and displaying graphical images comprising:
   graphical output means for drawing graphical objects on said graphical images for viewing by a user;
   database means for storing and retrieving information regarding said graphical objects to be drawn by said graphical output means, said information including nominal placement of said graphical objects on said graphical images;
   rule definition means for permitting a user of said apparatus to define placement rules for modifying said nominal placement of said graphical objects on said graphical images, said placement rules comprising overplot information elements for specifying which of said graphical objects may be overplotted by others of said graphical objects; and rule application means operatively linked with said database means, with said rule definition means, and with said graphical output means, for applying information representing said placement rules to said information regarding said graphical objects to modify said nominal placement of said graphical objects on said graphical images in accord with said overplot information elements and to cause said graphical output means to draw said graphical objects on said graphical images.

2. The apparatus of claim 1 wherein said rule definition means further comprises:

user input means for receiving said placement rules from an operator of said apparatus;

user output means for communicating said placement rules to said operator; and storage means for storing said placement rules created by said operator.

3. The apparatus of claim 1 further comprising communication means connecting said database means and said rule application means for exchange of information between said database means and said rule application means.

4. The apparatus of claim 3 wherein said rule application means further comprises client means cooperatively engaged with said communication means for requesting said information from said database means; and wherein said database means further comprises server means cooperatively engaged with said communication means for accepting requests from said client means and for returning information to said client means.

5. The apparatus of claim 1 wherein said database means further comprises storage means for storing said information regarding said graphical objects to be drawn on said graphical image.

6. The apparatus of claim 1 wherein said graphical output means further comprises a two dimensional plotting device.

7. The apparatus of claim 1 wherein said graphical output means further comprises a video display device.

8. The apparatus of claim 1 wherein said placement rules further comprise:

query elements which, when applied to said database means, retrieves information regarding particular ones of said graphical objects;

placement modification elements which, when applied to said nominal placement information, modifies said nominal placement information of each of said particular ones of said graphical objects; and drawing primitive elements which, when applied to said graphical output means, cause the drawing of said particular ones of said graphical objects on said graphical images.

9. The apparatus of claim 8 wherein said rule application means further comprises:

query processing means for applying said query elements to said database means and for retrieving said information regarding said particular ones of said graphical objects;

placement processing means for applying said placement modification elements to said nominal placement information of each of said particular ones of said graphical objects, said placement processing means being adapted to determine a modified placement position for said each of said particular ones of said graphical objects; and drawing output means responsive to said placement processing means for applying said drawing primitive elements to said graphical output means to cause the drawing of said particular ones of said graphical objects on said graphical images at said modified placement positions.

10. The apparatus of claim 9 wherein said placement modification elements comprise a plurality of possible placement modification elements; and wherein said placement processing means further comprises:

placement attempt means for applying said plurality of possible placement modification elements to said nominal placement information of each of said particular ones of said graphical objects, said placement attempt means being adapted to produce at least one possible modified placement position of said each of said particular ones of said graphical objects;

overplot evaluation means for applying said overplot information elements to said at least one possible modified placement position, said overplot evaluation means being adapted to produce success or failure status information for each of said at least one possible modified placement position; and position selection means responsive to said success or failure status information for selecting one of said at least one possible modified placement position.

11. In a apparatus for creating and displaying graphical images, a method for producing said graphical images comprising the steps of:

reading information describing graphical objects to be drawn on said graphical images, said information including nominal placement of said graphical objects in said graphical images;

reading modification information comprising user supplied placement rules for modifying said nominal placement of said graphical objects in said graphical images, wherein said placement rules comprise overplot information elements for specifying which of said graphical objects may be overplotted by others of said graphical objects;

applying said modification information to said graphical objects to modify said nominal placement of said graphical objects on said graphical images in accord with said overplot information elements; and drawing said graphical objects in said graphical images at said modified nominal placement position to permit viewing by a user.

* * * * *